United States Patent
Kopp et al.

(10) Patent No.: US 7,308,173 B2
(45) Date of Patent: Dec. 11, 2007

(54) OPTICAL FIBER COUPLER WITH LOW LOSS AND HIGH COUPLING COEFFICIENT AND METHOD OF FABRICATION THEREOF

(75) Inventors: Victor Il'ich Kopp, Flushing, NY (US); Victor Tchourikov, West Patterson, NY (US); Jonathan Singer, Summit, NJ (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 259 days.

(21) Appl. No.: 11/015,565

(22) Filed: Dec. 18, 2004

(65) Prior Publication Data

US 2005/0135740 A1   Jun. 23, 2005

Related U.S. Application Data

(60) Provisional application No. 60/530,517, filed on Dec. 18, 2003.

(51) Int. Cl.
*G02B 6/26* (2006.01)
*G02B 6/42* (2006.01)

(52) U.S. Cl. .......................... 385/43; 385/15; 385/31; 385/39; 385/42; 385/50

(58) Field of Classification Search ................ 385/43
See application file for complete search history.

(56) References Cited

U.S. PATENT DOCUMENTS 4,763,976 A * 8/1988 Nolan et al. .................. 385/43
4,795,228 A * 1/1989 Schneider ..................... 385/31
4,877,300 A * 10/1989 Newhouse et al. ........... 385/43
5,180,410 A * 1/1993 Berkey ......................... 65/403
6,272,268 B1 * 8/2001 Miller et al. .................. 385/43
6,330,382 B1 * 12/2001 Harshbarger et al. ........ 385/28
2003/0035631 A1* 2/2003 Eggleton et al. ............. 385/43

* cited by examiner

Primary Examiner—Frank G. Font
Assistant Examiner—Ryan Lepisto
(74) Attorney, Agent, or Firm—Edward Etkin, Esq.

(57) ABSTRACT

An optical fiber coupler capable of providing a low loss, high coupling coefficient interface between conventional optical fibers and optical waveguide devices is provided. The novel coupler, which may be polarization maintaining, if a polarization maintaining preform is used in its fabrication includes a core, a cladding, a first end for interfacing with an optical fiber and a second end for interfacing with an optical waveguide device. The sizes of the core and cladding are gradually reduced from the first end to the second end in accordance with a predetermined reduction profile. Various parameters, such as refractive indices and sizes of the core and cladding and the reduction profile are selected to produce a low numerical aperture at the first end and a high numerical aperture at the second end, while advantageously minimizing insertion loss and maximizing the coupling coefficient at each end. In another embodiment, the novel coupler includes a secondary cladding which is also reduced between the first and second ends to improve the strength of the coupler structure at the second end. In yet another embodiment, one or two novel couplers are formed along with a chiral fiber based optical waveguide device as a single continuous element. The optical fiber preform used to fabricate the novel optical fiber coupler can be etched prior to fabrication to facilitate application of the reduction profile.

16 Claims, 6 Drawing Sheets

FIG. 7A
"Prior Art"
FIG. 7B
"Prior Art"
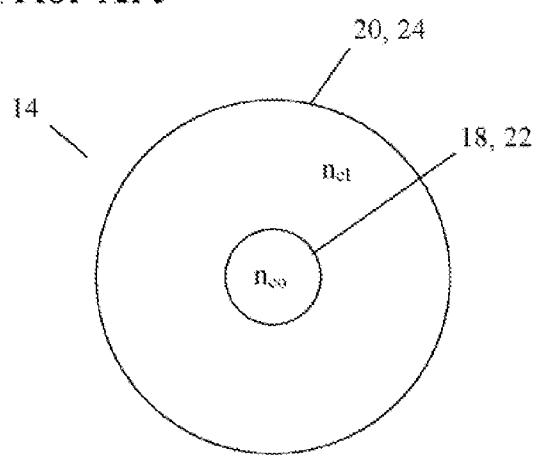
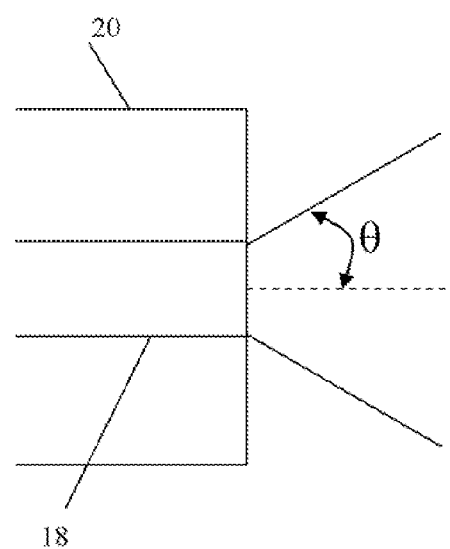
FIG. 8
"Prior Art"
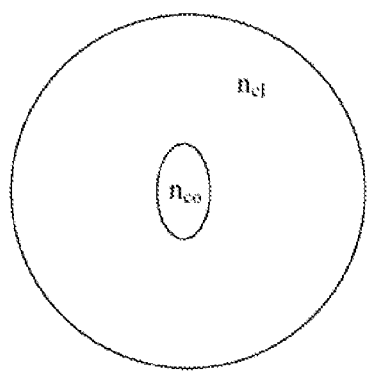

OPTICAL FIBER COUPLER WITH LOW LOSS AND HIGH COUPLING COEFFICIENT AND METHOD OF FABRICATION THEREOF

CROSS REFERENCE TO RELATED APPLICATIONS

The present patent application claims priority from the commonly assigned U.S. provisional patent application Ser. No. 60/530,517 entitled "Optical Fiber Coupler with Low Loss and High Coupling Coefficient and Method of Fabrication Thereof" filed Dec. 18, 2003.

FIELD OF THE INVENTION

The present invention relates generally to couplers, and more particularly to an optical fiber coupler capable of providing a low loss, high coupling coefficient interface between conventional optical fibers and optical waveguide devices.

BACKGROUND OF THE INVENTION

Optical waveguide devices are indispensable in various high technology industrial applications, and especially in telecommunications. In recent years, these devices, including planar waveguides, and two or three dimensional photonic crystals are being used increasingly in conjunction with conventional optical fibers. In particular, optical waveguide devices based on chiral optical fibers are advantageous and desirable in applications in which conventional optical fibers are also utilized. Such chiral fiber devices are disclosed in the following commonly assigned, issued U.S. Patents, and co-pending commonly assigned Patent application, all of which are hereby incorporated by reference in their entirety: "Chiral Fiber grating" (U.S. Pat. No. 6,839,486), "Chiral In-Fiber Adjustable Polarizer Apparatus and Method" (U.S. Pat. No. 6,721,469), "Chiral Fiber Sensor Apparatus and Method" (U.S. Pat. No. 6,792,169), "Customizable Chirped Chiral Fiber Bragg Grating" (U.S. patent application Ser. No. 10/311,447), "Chiral Broadband Tuning Apparatus and Method" (U.S. Pat. No. 7,009,679), "Customizable Apodized Chiral Fiber Grating Apparatus and Method" (U.S. Pat. No. 6,741,631), "Extended Chiral Defect Structure Apparatus and Method", (U.S. Pat. No. 7,142,280), and "Long Period Chiral Fiber Grating Apparatus, (U.S. Pat. No. 6,925,230).

However, there are significant challenges in interfacing optical waveguide devices, including chiral optical fiber devices, with conventional low index contrast optical fibers. Typically, at least two major obstacles must be dealt with:
(1) the difference between the diameters of the optical waveguide device and the conventional fiber (especially with respect to the differences in core sizes), and
(2) the difference between the numerical apertures of the optical waveguide device and the conventional fiber. Failure to properly address these obstacles results in increased insertion losses and a decreased coupling coefficient at each interface.

While attempts have been made to address the difficulties of interfacing between different optical fibers, as well as between optical fibers and signal sources, the proposed solutions do not address the challenge of mismatched apertures. As a result, the connected optical fiber becomes undesirably multi-mode. For example, the U.S. Pat. No. 4,877,300 to Newhouse et. al., discloses a tapered connector, for use with optical fibers and light sources connectable to optical fibers, that is purported to be less sensitive to misalignment. However, the approach proposed in the Newhouse patent increases the waveguide diameter of the connector. As a result, the connector becomes multi-mode, and therefore loses the capability of maintaining a single, or a predetermined small number of modes which may be a key requirement in interfacing optical waveguide devices (e.g., planar waveguides, or chiral optical fiber devices) with conventional low-index-contrast optical fibers. Furthermore, the connector disclosed in the Newhouse patent does not provide a solution for the challenge of mismatched apertures of optical waveguide devices and conventional optical fibers.

It would thus be desirable to provide an optical fiber coupler that provides a high coupling coefficient interface between an optical waveguide device having a high numerical aperture and a conventional optical fiber having a low numerical aperture. It would further be desirable to provide an optical fiber coupler having configurable characteristics for interfacing with optical waveguide devices and optical fibers of different sizes and characteristics. It would also be desirable to provide an optical coupler that is capable of substantially maintaining a single mode or a greater predetermined number of modes therein. It would additionally be desirable to provide an optical fiber coupler that can be easily and inexpensively fabricated. It would also be desirable to provide an optical fiber coupler that is capable of being fabricated as part of an optical waveguide device.

BRIEF DESCRIPTION OF THE DRAWINGS

FIG. 7A and 7B are schematic diagrams of a cross-section view, and a side view, respectively, of a conventional optical fiber; and FIG. 8 is a schematic diagram of a cross-section view of a polarization maintaining optical fiber.

SUMMARY OF THE INVENTION

Figure 1:
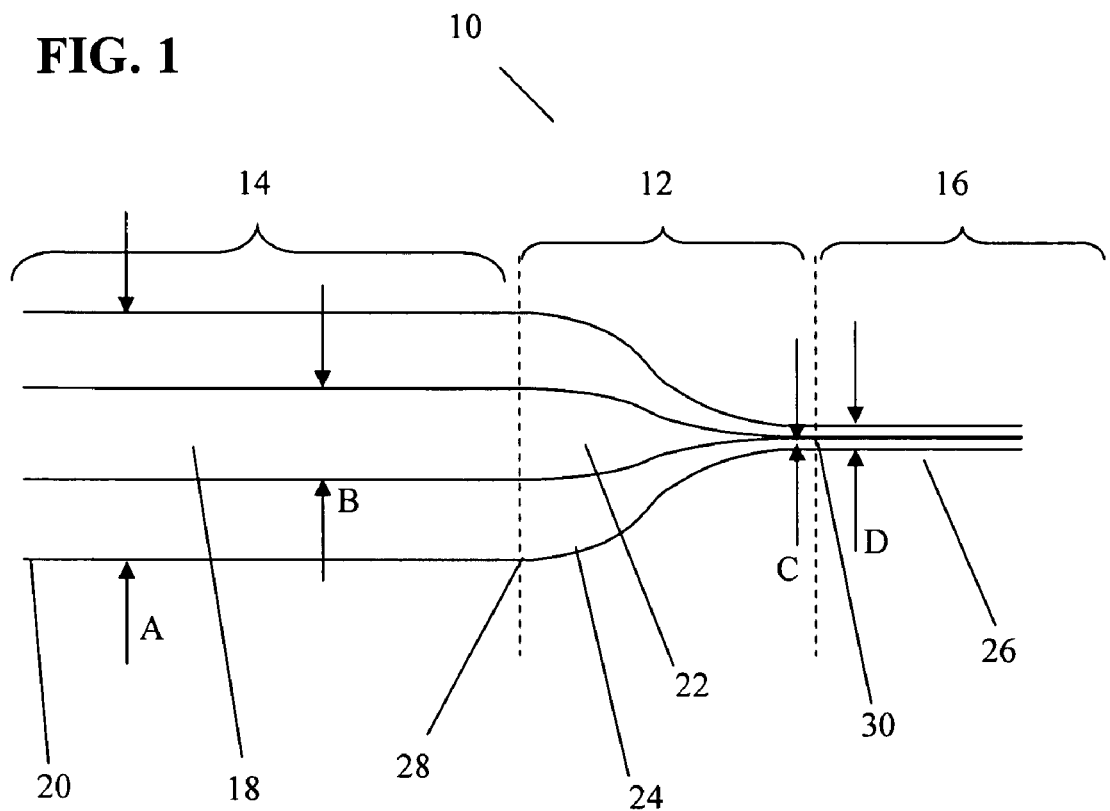
FIG. 1 is a schematic diagram of a side view of a first embodiment of the optical fiber coupler of the present invention.

The present invention is directed to a novel optical fiber coupler capable of providing a low loss, high coupling coefficient interface between conventional optical fibers and optical waveguide devices, even when the core diameters and numerical apertures differ. The novel coupler may be configured as a stand-alone device, or it may be integrated into an optical waveguide device.

The novel coupler includes a core, a cladding, a first end for interfacing with an optical fiber and a second end for interfacing with an optical waveguide device. The advantageous properties of the novel coupler are achieved as follows. Utilizing a pre-configured preform having a core and cladding, the sizes of the preform's core and cladding are gradually reduced from the first end to the second end, in accordance with a predetermined reduction profile. Various parameters, such as refractive indices, sizes of the core and cladding, and the reduction profile are selected to produce a low numerical aperture at the first end of the resulting coupler, and a high numerical aperture at the second end, while advantageously minimizing insertion loss and maximizing the coupling coefficient at each end.

In another embodiment, the novel coupler includes a secondary cladding which is also reduced between the first and second ends to isolate and protect the coupler from the surrounding environment. In yet another embodiment, one or two novel couplers are formed along with and integrated into a chiral fiber-based optical waveguide device as a single continuous element. An optical fiber preform used to fabricate the novel optical fiber coupler can be etched prior to fabrication to facilitate application of the reduction profile. Furthermore, the optical fiber preform used to fabricate the novel coupler may be a conventional optical fiber, or it may be a polarization maintaining optical fiber if the application for which the novel coupler is intended requires that polarization be maintained.

Each of the above-described embodiments of the present invention, has specific advantages making it advantageous in particular types of applications.

Other objects and features of the present invention will become apparent from the following detailed description, considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to an optical fiber coupler capable of providing a low loss, high coupling coefficient interface between conventional optical fibers and optical waveguide devices. The novel coupler includes a core, a cladding, a first end for interfacing with an optical fiber, and a second end for interfacing with an optical waveguide device. In summary, the respective sizes of the coupler's core and cladding gradually decrease between the first end and the second end in accordance with a predetermined reduction profile. During fabrication of the novel coupler, various parameters, such as refractive indices and sizes of the core and cladding, and the reduction profile are selected and configured to produce a low numerical aperture waveguide at the first end and a high numerical aperture waveguide at the second end, while advantageously minimizing insertion loss and maximizing the coupling coefficient at each end.

In accordance with the present invention, to produce the desired numerical apertures at the appropriate ends of the novel coupler, the second core size is preferably selected to be insufficient to guide light, while the second cladding size is selected to match the number of optical modes supported by the optical waveguide device, such that light traveling from the first end to the second end, escapes from the core into the cladding proximal to the second end. Conversely, light traveling from the second end to the first end moves from the cladding into the core proximal to the first end.

The cladding is preferably surrounded by a medium having a third refractive index which is lower than the refractive index of the cladding. The medium may be air or another gas, fluid, gel, epoxy. Alternately, in another embodiment of the present invention discussed below in connection with FIG. 5, the medium may be an additional cladding, which is also reduced between the first and second ends of the coupler, to form a secondary cladding over the original cladding, that serves as the waveguide at the second end. This arrangement improves the coupling coefficient at the second end of the coupler.

In yet another embodiment of the present invention, one or two novel couplers are formed along with a chiral fiber based optical waveguide device as a single continuous element.

Referring now to FIG. 1, a first embodiment of an inventive optical fiber coupler 12, is shown as part of an interface assembly 10. The coupler 12 serves as an interface between an optical fiber 14 (having an optical fiber core 18 and a cladding 20), and an optical waveguide device 16. Before describing the novel coupler 12 in greater detail, it would be helpful to discuss the optical fiber 14, and the optical waveguide device 16 in greater detail.

The optical fiber 14 may be a conventional low-index-contrast optical fiber with the core 18 and the cladding 20 (as shown in FIGS. 7A and 7B). As shown in FIG. 1, the optical fiber core 18 has a size B, while the optical fiber cladding 20 has a size A. An additional parameter of the optical fiber 14, is shown in FIG. 7B, as an angle θ, defining a "cone" within which light leaves the fiber core 18. Accordingly, the numerical aperture of the fiber 14 may be expressed as a $\sin(\theta)$.

Alternately, the optical fiber 14, may be a polarization maintaining fiber with a non-circular core (as shown in FIG. 8). Alternately, the polarization maintaining fiber 14 may be a PANDA fiber, in which two stress members made from different glasses from a cladding, run within the cladding parallel with a core. A PANDA fiber is shown as an exemplary preform in FIG. 6E.

The optical waveguide device 16, having a size D, may be an optical device based on two and/or three dimensional photonic crystals, based on planar waveguides, or based on chiral fiber gratings. In particular, it is advantageous and desirable to use optical waveguide devices based on chiral optical fiber gratings in applications where conventional optical fibers are utilized. Such chiral fiber devices are disclosed in the following above-incorporated commonly assigned issued U.S. Patents: U.S. Pat. No. 6,721,469 entitled "Chiral In-Fiber Adjustable Polarizer Apparatus and Method", U.S. Pat. No 6,792,169 entitled "Chiral Fiber Sensor Apparatus and Method", U.S. Pat. No. 6,741,631 entitled "Customizable Apodized Chiral Fiber Grating Apparatus and Method", U.S. Pat. No. 6,839,486 entitled "Chiral Fiber Grating", U.S. Pat. No. 7,009,679 entitled "Chiral Broadband Tuning Apparatus and Method", U.S. Pat. No. 7,142,280 entitled "Extended Chiral Defect Structure Apparatus and Method", U.S. Pat. No. 6,925,230 entitled "Long Period Chiral Fiber Grating Apparatus", and in the above-incorporated co-pending commonly assigned U.S. patent application Ser. No. 10/313,447 entitled "Customizable Chirned Chiral Fiber Bragg Grating".

As can be seen from FIG. 1, there is a significant difference in the diameters of the core 18 and the waveguide portion of the optical waveguide device 16, as well as in their numerical apertures. These differences are the key obstacles in interfacing and splicing optical fibers to optical waveguide devices. In accordance with the present invention, the novel coupler 12 serves to address the obstacles arising from the differences in the diameters and the numerical apertures, while minimizing insertion loss and maximizing the coupling coefficient at each of its ends.

The coupler 12 includes a core 22 and a cladding 24, with respective refractive indices $n_{co}$ and $n_{cl}$, where $(n_{co} > n_{cl})$. The coupler 12 is also surrounded by a medium such as air, another gas, a fluid, or a solid material (not shown), having its own refractive index $n_m$, smaller than $n_{co}$. The coupler 12 is preferably drawn from an optical fiber preform that may be based on any of the fibers shown in FIGS. 6A to 6G. For applications that require the coupler 12 to be polarization maintaining, the preform used to fabricate the inventive coupler must also be polarization maintaining (such as the preforms shown in FIGS. 6B to 6G).

The essence of the present invention, is that the sizes of the core 22 and the cladding 24 are reduced in accordance with a predetermined reduction profile between a first end 28 of the coupler 12 (interface with the optical fiber 14) and a second end 30 of the coupler 12 (interface with the optical waveguide device 16). Thus, between the ends 28 and 30, the core 22 is gradually reduced from size B to size C, while the cladding 24 is gradually reduced from size A to size D. Preferably, size C is selected to be insufficient to guide light, while the size D is selected to match the number of optical modes supported by the optical waveguide device, such that light traveling from the first end 28 to the second end 30, escapes from the core 22 into the cladding 24 proximal to the second end 30. Conversely, light traveling from the second end 30 to the first end 28, moves from the cladding 24 into the core 22 proximal to the first end 28.

The size D of the cladding 24 enables it to readily interface with, for example, a core 26 of an optical waveguide device 16. Preferably, sizes A, B, C and D, as well as the refractive indices $n_{co}$, $n_{cl}$, and $n_m$, and the reduction profile are selected and configured to minimize the insertion losses and maximize the coupling coefficient at both ends 28, 30 of the coupler 12. Furthermore, in accordance with the present invention, the difference between $n_{cl}$ and $n_m$, is preferably greater that the difference between $n_{co}$ and $n_{cl}$.

While the reduction profile shown in FIG. 1 shows a proportional reduction in core 22 and cladding 24 sizes between the ends 28, 30, it should be noted that as a matter of design choice, without departing from the spirit of the invention, the reduction profile can be non-proportional with respect to the core 22 and the cladding 24, and thus it may be random, linear, or it may be determined in accordance with a mathematical function (such as a cosine function).

Figure 2:
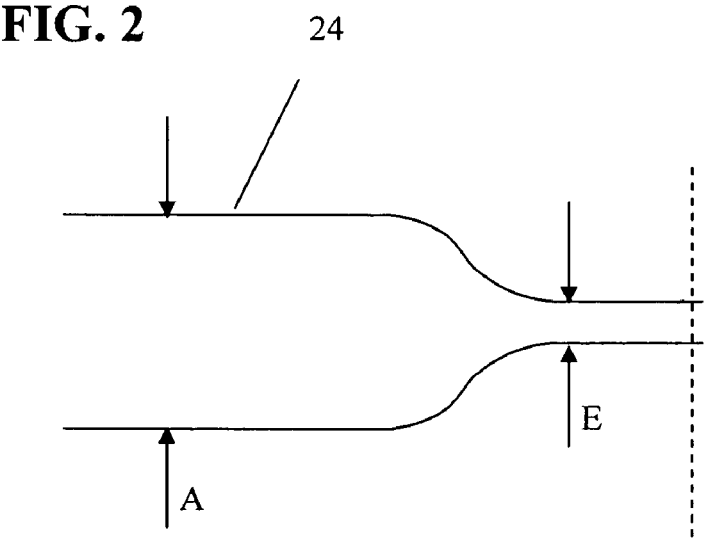
FIG. 2 is a schematic diagram of a side view of an exemplary preform that may be used to fabricate the novel optical fiber coupler of FIG. 1.

One of the obstacles in fabricating the coupler 12, is that the difference between the sizes A and B may be quite significant, and thus, when the proportional reduction profile is applied, the core 22 may reach a size at which it is not able to guide light, long before the cladding 24 reaches the desired size D. Referring now to FIG. 2, this obstacle can be readily overcome by a preliminary reduction of the cladding 24 diameter, for example by etching the cladding 24 from the size A to a smaller size E, prior-to applying the reduction profile. Thus, the cladding 24 will be reduced from size E to size D during the coupler 12 fabrication process, rather than from size A to size D.

Figure 6A:
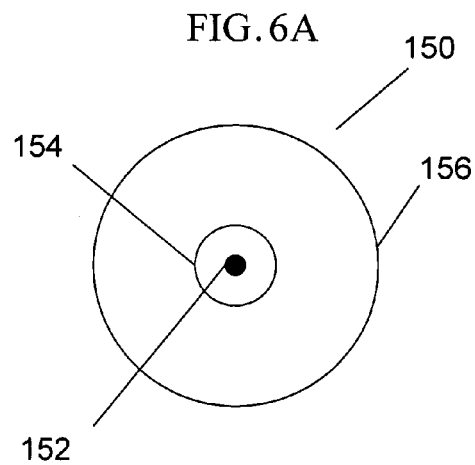
FIG. 6A is a schematic diagram of a cross-section view of a first embodiment of an exemplary preform used to fabricate the novel optical fiber coupler.
Figure 6B:
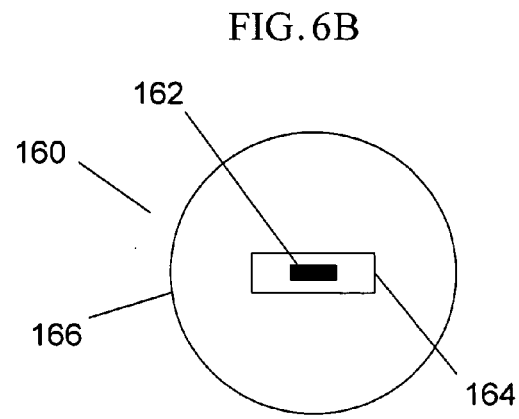
FIG. 6B is a schematic diagram of a cross-section view of a second embodiment of an exemplary preform that may be used to fabricate the novel optical fiber coupler.
Figure 6C:
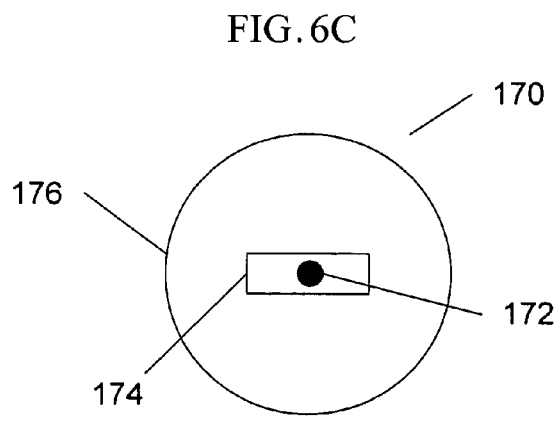
FIG. 6C is a schematic diagram of a cross-section view of a third embodiment of an exemplary preform that may be used to fabricate the novel optical fiber coupler.
Figure 6D:
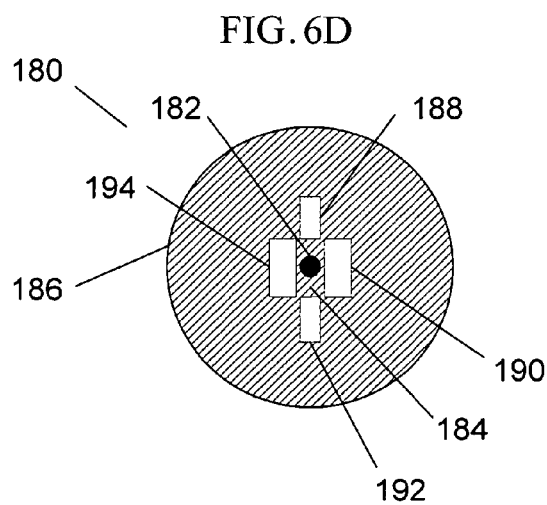
FIG. 6D is a schematic diagram of a cross-section view of an alternate embodiment of the exemplary preform of FIG. 6C, that may be used to fabricate the novel optical fiber coupler.
Figure 6E:
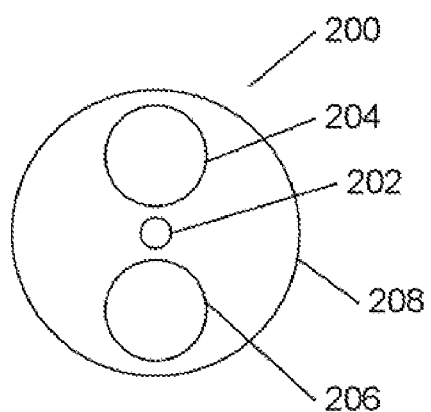
FIGS. 6E to 6G are a schematic diagram of a cross-section view of an exemplary preform that may be used to fabricate a novel optical fiber coupler.
Figure 6F:
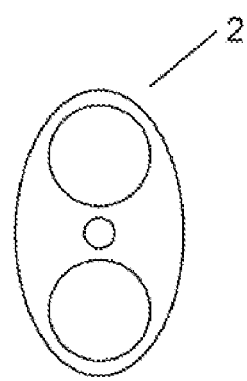
Figure 6G:
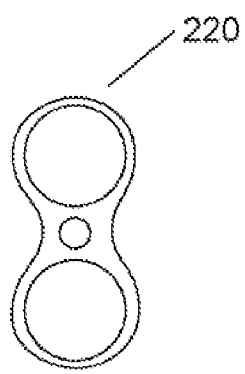

Referring now to FIGS. 6E to 6G, if the coupler 12 is based on a PANDA fiber preform 200, etching the preform 200 around the stress members 204, 206 (as shown in FIGS. 6F and 6G) produces a non-circular cross-section preform to further enhance the coupler 12's ability to maintain light polarization.

Figure 3:
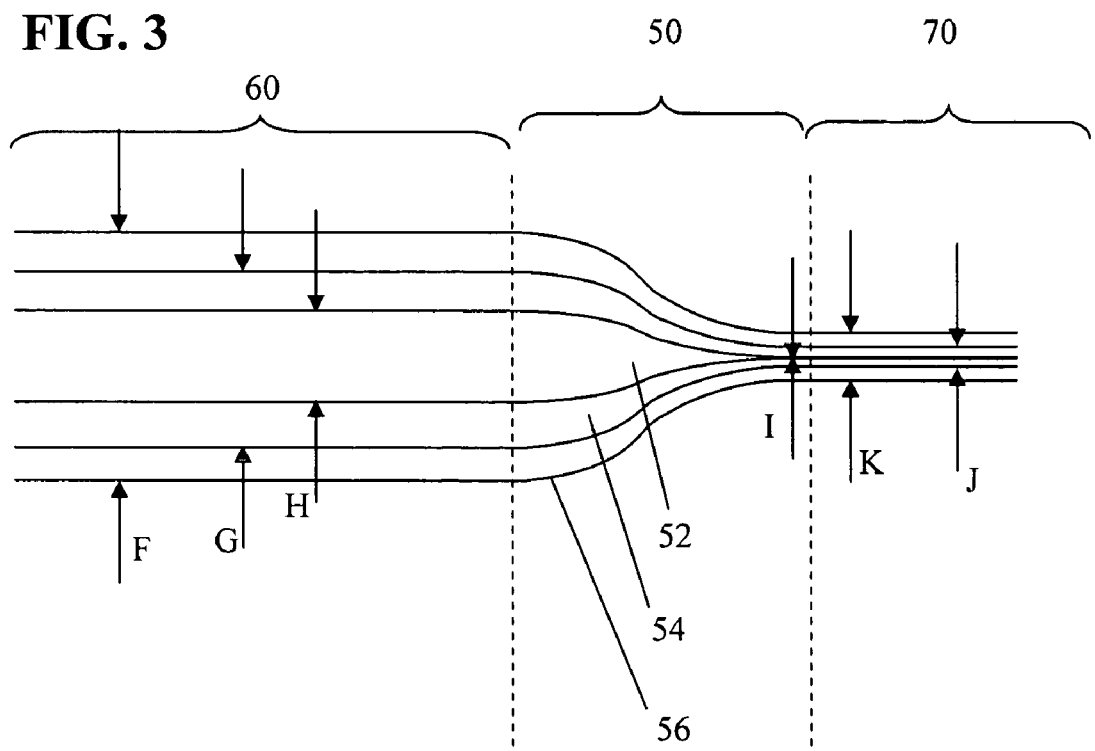
FIG. 3 is a schematic diagram of a side view of a second embodiment of the optical fiber coupler of the present invention.

Referring now to FIG. 3, a second embodiment of the coupler of the present invention is shown as a coupler 50, serving as an interface between an optical fiber 60, and an optical waveguide device 70. The optical fiber 60, and the optical waveguide device 70 are substantially similar to the fiber 14 and optical waveguide device 16 of FIG. 1, except that the medium surrounding these components is an additional cladding applied to each respective component 60, 70.

Figure 4:
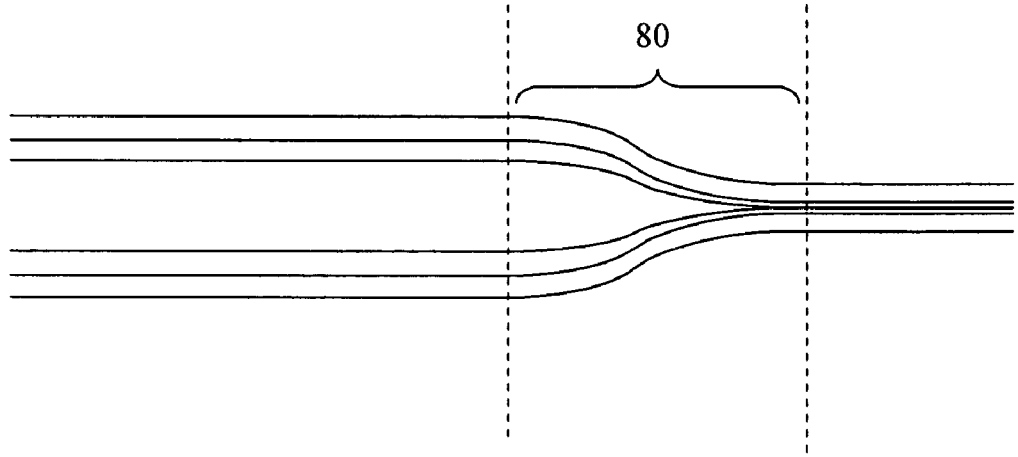
FIG. 4 is a schematic diagram of a side view of a third embodiment of the optical fiber coupler of the present invention.

Similarly, the coupler 50, is equivalent to the coupler 12 of FIG. 1, except that the medium surrounding a core 52 and a cladding 54 thereof, is configured as a second cladding 56 (with the refractive index $n_m$) surrounding the cladding 54. As the reduction profile is applied, the core 52 is reduced from size H to size I, the cladding 54 is reduced from size G to size J, while the second cladding 56 is reduced from size F to size K. This arrangement ensures that the second cladding 56 isolates and protects the reduced size cladding 54 from the surrounding environment. Referring now to FIG. 4, an exemplary embodiment of the coupler 50 is shown as a coupler 80 that is identical in all respects to the coupler 50 except that the reduction profile applied thereto between its ends is non-proportional. Preferably, sizes F, G, H, I, J and K, as well as the refractive indices $n_{co}$, $n_{cl}$, and $n_m$, and the reduction profile are selected and configured to minimize the insertion losses and maximize the coupling coefficient at both ends of the coupler 50.

While the couplers 12 and 50 shown in FIGS. 1, 3 and 4 above may be readily fabricated on their own using specially configured fiber drawing equipment and appropriate preforms (such as ones shown in FIGS. 6A to 6G or otherwise), in another embodiment of the present invention, an optical waveguide device may be fabricated with one or two novel couplers integrated therein as a single unit. This arrangement may be advantageous in simplifying the task of interfacing the waveguide device with conventional optical fibers, making a separate coupler unnecessary.

Figure 5:
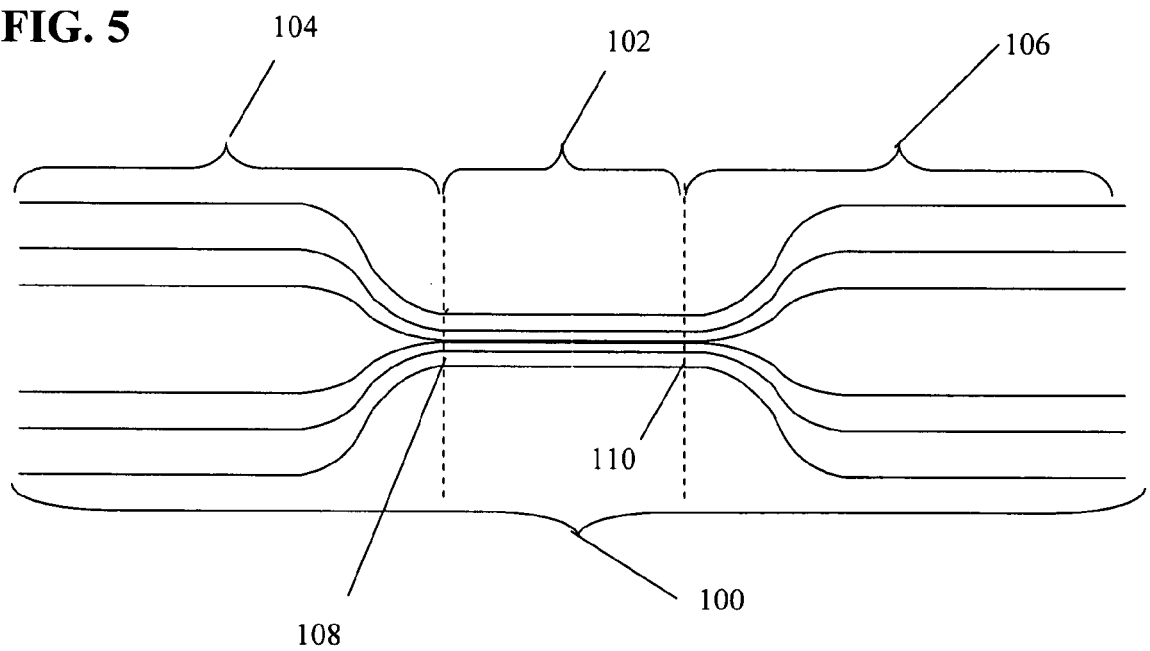
FIG. 5 is a schematic diagram of a side view of a fourth embodiment of the optical fiber coupler of the present invention where one or two of the novel couplers are formed along with an optical waveguide device as a single element.

Referring now to FIG. 5, an optical waveguide device 100 is shown. The device 100 includes an optical waveguide element 102, which may be an optical chiral fiber based device, such as disclosed in the above-incorporated patents and patent applications or any other optical waveguide component, having a first end 108 and a second end 110, and a coupler 104 and 106 at either, or optionally, at both ends 108 and 110, depending on whether the device 100 is to be interfaced with an optical fiber (e.g. optical fiber 14 of FIG. 1, or optical fiber 60 of FIG. 3) at one or both of its ends. The couplers 104, 106 may be the same as the coupler 12 of FIG. 1, or the coupler 50 of FIG. 3, and are preferably formed with the element 102 as a single continuous unit. If the waveguide element 102 is based on a chiral optical fiber grating, then the device 100 can be readily fabricated as a single device utilizing the novel apparatus disclosed in the commonly assigned, co-pending U.S. patent applcation Ser.

No. 10/099,623, entitled "Apparakis and Method for Fabricating chiral Fiber Gratings" which is hereby incorporated by reference in its entirety.

Referring now to FIGS. 6A to 6G, cross sections of various exemplary embodiments of preforms that may be used to fabricate the coupler 12 and/or the coupler 50) are shown. Referring first to FIG. 6A, a preform 150 may be utilized if the resulting coupler 50 is not intended to be polarization maintaining. The preform 150 includes a core 152, a cladding 154, and an outer cladding 156, corresponding to the core 52, cladding 54, and a second cladding 56 of FIG. 3.

Referring to FIG. 6B, a preform 160 may be utilized if the resulting coupler 50 is intended to be polarization maintaining. The preform 160 includes a core 162, a cladding 164, and an outer cladding 166, corresponding to the core 52, cladding 54, and a second cladding 56 of FIG. 3. The desirable polarization maintaining properties of the preform 160 depend on the non-circular core 162 and non-circular cladding 164, and their cross-sectional angular alignment with respect to one another.

Referring to FIG. 6C, a preform 170, which may be utilized if the resulting coupler 50 is intended to be polarization maintaining, may serve as an alternative to the preform 160 of FIG. 6B to address the challenge of precise cross-sectional angular alignment of the core 162 and the cladding 164. The preform 170 includes a core 172, a cladding 174, and an outer cladding 176, corresponding to the core 52, cladding 54, and a second cladding 56 of FIG. 3. The circular cross-section of the core 172 does not require precise angular alignment of the cladding 174. Instead, the desirable polarization maintaining properties are achieved when the preform 170 is drawn and the core 172 is subjected to stress-induced birefringence due to stress imposed on the cladding 174 by the outer cladding 176.

Referring to FIG. 6D, while the preforms 160 and 170 of FIGS. 6B and 6C respectively, require the use of three different materials for each of the core, cladding and outer cladding, a preform 180 accomplishes the objectives of preforms 160 or 170 by use of only two different materials. The preform 180 has a core 182, and an outer cladding 186, with a "virtual" cladding 184 defined around the core 182. This is accomplished by fabricating the preform 180 with hollow regions 188, 190, 192, 194, surrounding the core 182 in such a manner as to define a substantially rectangular region around the core 182 that serves as the cladding 184 (similarly to the claddings 154, 164 of FIGS. 6B and 6C, respectively). Thus, the hollow regions 188, 190, 192, 194 having a refractive index $n_m$, serve as the outer cladding (similarly to the outer claddings 156, 166 of FIGS. FIGS. 6B and 6C, respectively).

Referring now to FIGS. 6E to 6G, a preform 200 is shown having a core 202, a cladding 208, and two stress members 204, 206, made from a different glass from the cladding 208, disposed within the cladding 208 in parallel with the core 202 (i.e. a PANDA fiber). This arrangement enables fabrication of a polarization maintaining coupler 12, because during drawing of the preform 200, the stress members 204, 206, impose stress-induced birefringence on the core 202. As described above in connection with FIG. 2, FIGS. 6F and 6G show the preform 200 as alternate preforms 210, 220, respectively, in various exemplary states of etching to reduce its outer diameter.

It should also be noted, that regardless of the type of preform utilized in fabrication of the inventive coupler, in one embodiment of the present invention, the preform (e.g. any of the preforms of FIGS. 6A to 6G) is spliced with the appropriate optical fiber at one end, prior to fabricating the novel coupler therefrom.

The inventive optical fiber coupler embodiments shown in FIGS. 1, 3, 4, and 5, thus address all of the disadvantages of the previously known couplers.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical fiber coupler, for use between a first optical waveguide device of a first numerical aperture, and a second optical waveguide device having a second numerical aperture, higher than said first numerical aperture, each of the first and second optical waveguide devices having a corresponding end face surface oriented toward one another, said optical fiber coupler having a capacity for at least one optical mode, and comprising:

an elongated optical fiber element having a longitudinal axis, a first end comprising a first face surface, selectively connectable to the end face surface of the first optical device positioned along said longitudinal axis, an opposite second end, comprising a second face surface, seletively connectable to the end face surface of the second optical device also positioned along said longitudinal axis, sequentially said optical fiber element, such that said elongated optical fiber element is positioned between the first and second optical waveguide devices along said longitudinal axis, a coupler core having a first refractive index, a first core size at said first end, and a second core size at said second end; and a coupler cladding having a second refractive index, a first cladding size at said first end face surface, and a second cladding size at said second end face surface, said second core and cladding sizes being substantially smaller than said first core and cladding sizes, said coupler cladding being surrounded by a medium having a third refractive index, wherein said first refractive index is greater than said second refractive index, wherein said second refractive index is greater than said third refractive index, wherein a difference between said second and said third refractive indices is greater that a difference between said first and said second refractive indices, wherein said first core size and said first cladding size are gradually reduced, in accordance with a predetermined reduction profile, between said first end face surface and said second end face surface along said optical fiber element, until said respective second core size and said second cladding size are reached, wherein said second core size is selected to be insufficient to guide light, said second cladding size is selected to guide the at least one mode of the optical waveguide device mode capacity, such that, light traveling from said first end to said second end escapes from said core into said cladding proximal to said second end, and exits from said second end face surface into the sequentially positioned second optical device end face surface, and light traveling from said second end to said first end moves from said cladding into said core proximal to said first end, and exits said first end face surface into the first optical device end face surface, so that said first end forms a low numerical aperture waveguide and said second end forms a high numerical aperture waveguide.

2. The coupler of claim 1, wherein said first, second, and third refractive indices, are selected and configured to maximize a coupling coefficient at each of said first and said second end face surfaces.

3. The coupler of claim 1, wherein said first core size and said first cladding size, said second core size and said second cladding size, and said predetermined reduction profile, are further selected and configured to maximize a coupling coefficient at each of said first and said second end face surfaces.

4. The coupler of claim 1, wherein said predetermined reduction profile comprises reducing each of said first core size and said first cladding size to said respective second core size and said second cladding size, proportionally to one another.

5. The coupler of claim 1, wherein said predetermined reduction profile is determined in accordance with one of: a linear mathematical function, a non-linear mathematical function, and a random function.

6. The coupler of claim 1, wherein said elongated optical fiber element is configured to be polarization maintaining.

7. The coupler of claim 6, wherein said cladding comprises a non-circular cross section proximal to said second end face surface, and wherein said core comprises a non circular cross-section proximal to said first end face surface.

8. The coupler of claim 1, wherein said medium is a gaseous, a fluid, a gel, or a solid environment.

9. The coupler of claim 1, wherein said medium is an additional cladding, said additional cladding having a first additional cladding size at said first end face surface and a second additional cladding size at said second end face surface, wherein said first additional cladding size is gradually reduced, between said first end face surface and said second end face surface along said optical fiber element, until said respective second additional cladding size is reached, and wherein said second cladding size is selected to be sufficient to isolate said coupler cladding from surrounding environment at, and proximal to, said second end face surface.

10. The coupler of claim 9, wherein said predetermined reduction profile comprises reducing each of said first core size, said first cladding size, and said first additional cladding size, to said respective second core size, said additional second cladding size, and said second cladding size, proportionally to one another.

11. The coupler of claim 9, wherein at least one of: said first core size, said first cladding size, said first additional cladding size, and said second core size, said second cladding size and said second additional cladding size, and said predetermined reduction profile are further selected and configured to maximize a coupling coefficient at each of said first and said second end face surfaces.

12. The coupler of claim 9, wherein said predetermined reduction profile comprises reducing each of said first core size, said first cladding size, and said first additional cladding size, to said respective second core size, said additional second cladding size, and said second cladding size, at different rates with respect to one another.

13. The coupler of claim 1, wherein said predetermined reduction profile comprises reducing each of said first core size and said first cladding size to said respective second core size and said second cladding size, at different rates with respect to one another.

14. The coupler of claim 1, wherein said medium is a fluid environment.

15. The coupler of claim 1, wherein said medium is a gel.

16. The coupler of claim 1, wherein said medium is a solid environment.

* * * * *